United States Patent
Rodriguez et al.

(10) Patent No.: US 10,937,033 B1
(45) Date of Patent: Mar. 2, 2021

(54) PRE-MODERATION SERVICE THAT AUTOMATICALLY DETECTS NON-COMPLIANT CONTENT ON A WEBSITE STORE PAGE

(71) Applicant: Amazon Technologies, Inc., Seattle, WA (US)

(72) Inventors: Pedro De Jesus Rodriguez, Seattle, WA (US); Aldo Rodrigo Garcia Mendiburu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 16/014,577

(22) Filed: Jun. 21, 2018

(51) Int. Cl.
*G06Q 30/00* (2012.01)
*G06Q 30/06* (2012.01)
*G06K 9/00* (2006.01)
*G06N 20/00* (2019.01)

(52) U.S. Cl.
CPC ..... *G06Q 30/0185* (2013.01); *G06K 9/00456* (2013.01); *G06N 20/00* (2019.01); *G06Q 30/0641* (2013.01)

(58) Field of Classification Search
CPC ........... G06Q 30/0185; G06Q 30/0641; G06N 20/00; G06K 9/00456
USPC .................................................... 705/26, 27
See application file for complete search history.

(56) References Cited

U.S. PATENT DOCUMENTS

| | | | |
|---|---|---|---|
| 9,563,845 B1* | 2/2017 | Porter | G06N 5/04 |
| 9,959,412 B2* | 5/2018 | Strauss | G06Q 30/0269 |
| 2015/0172243 A1* | 6/2015 | Parikh | H04L 51/12 |
| | | | 709/206 |
| 2015/0186975 A1* | 7/2015 | Vierra | G06Q 30/0627 |
| | | | 705/26.63 |
| 2015/0302886 A1* | 10/2015 | Brock | H04L 63/0263 |
| | | | 726/32 |
| 2017/0270535 A1* | 9/2017 | McKee | G06Q 30/018 |

OTHER PUBLICATIONS

Facebook Inc.; Patent Issued for Sampling Content Using Machine Learning to Identify Low-Quality Content (U.S. Pat. No. 9,959,412) Computers, Networks & Communications [Atlanta] May 17, 2018: 2937; Dialog #2036824385, 3pgs. (Year: 2018).*

* cited by examiner

*Primary Examiner* — Robert M Pond
(74) *Attorney, Agent, or Firm* — Kilpatrick Townsend & Stockton LLP

(57) ABSTRACT

Techniques for providing a pre-moderation feature for content that is submitted for a web page are described herein. For example, data may be received for a content submission of a web site prior to the content being incorporated into the web site. Text and images included in the data may be extracted based on a recognition algorithm. A determination that at least one of the extracted text or the extracted images include non-compliant content may be made based on compliance policies. In embodiments, a warning may be generated that corresponds to non-compliant text or non-compliant images included in the extracted text or images. The warning may be transmitted to a user device associated with the content submission.

20 Claims, 7 Drawing Sheets

(12) United States Patent
US 10,937,033 B1

PRE-MODERATION SERVICE THAT AUTOMATICALLY DETECTS NON-COMPLIANT CONTENT ON A WEBSITE STORE PAGE

BACKGROUND

Users can now offer or submit a variety of consumable items for sale via the internet that can reach a number of consumers all over the world. The process of communicating such items to willing consumers can be performed via online retailers and/or electronic marketplaces through the utilization of images and details for their products. However, certain problems can occur during the submission of images and details related to a user's web store or other provided content when submitting the content. Conventional systems may utilize a manual moderation service (e.g., human review) to analyze submitted content for errors or violations of policies regarding misleading or inappropriate material. However, conventional manual moderation services can take days or weeks to review submitted content before it is approved and incorporated into a user's web site. Moreover, conventional manual moderation services can make mistakes, mislabel content, or apply policies incorrectly such that users are left frustrated with the process and are unable to offer the items that they wish to sell let alone details about the item.

BRIEF DESCRIPTION OF THE DRAWINGS

Various embodiments in accordance with the present disclosure will be described with reference to the drawings, in which.

DETAILED DESCRIPTION

Figure 1:
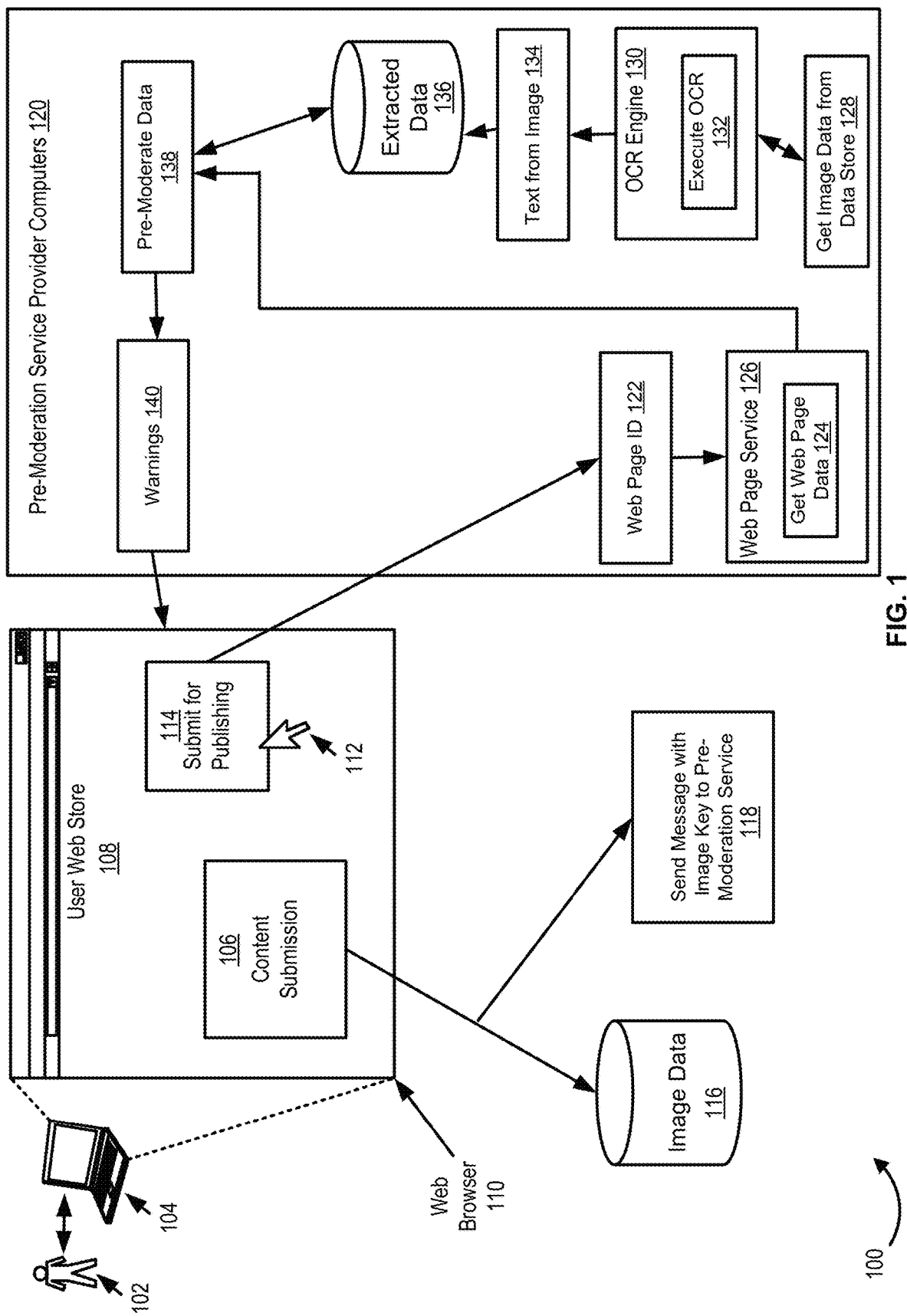
FIG. 1 illustrates a workflow for a pre-moderation feature in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a pre-moderation feature for identifying non-compliant content prior to the content being published or otherwise incorporated into a web site such as a web store. The pre-moderation feature described herein can identify non-compliant content and warn a user submitting the content such that they can correct the content prior to review by a moderation service. In accordance with at least one embodiment, the pre-moderation feature can extract text and images in content that is submitted by a user for incorporation to a web site or web store using recognition algorithms such as optical character recognition (OCR), image recognition, or object recognition. The pre-moderation feature may generate a score for each extracted text object or image object that corresponds to a confidence in identification of the text object or image object by the recognition algorithms. In embodiments, service provider computers implementing the pre-moderation feature may use one or more thresholds to determine if the confidence score exceeds the threshold and that the item has been correctly identified. In cases where a text object or image object has been properly identified, the object can be analyzed to determine if it includes non-compliant content.

In accordance with at least one embodiment, compliance policies may be utilized to determine if an identified text object or image object includes non-compliant content. For example, compliance policies may include policies for identifying whether submitted text includes incorrect grammar, punctuation, spelling, font size, or capitalization errors. Compliance polices may identify whether an image or text includes promotional messages that can't be supported by an associated web store, whether an image is cropped incorrectly, or utilizes a resolution that is inappropriate for the web site, whether images are obscured by other objects, or whether hyperlinks included in the content are broken. In accordance with at least one embodiment, the pre-moderation feature may generate one or more warnings or recommendations and update a user interface or web browser to inform the user about the non-compliant content as well as give the user an opportunity to modify previously submitted text or images and correct the non-compliant content. In embodiments, the user interface or web browser may visually highlight or otherwise indicate portions of the web site, web store, or content that corresponds to the non-compliant content included in the warnings or recommendations.

In accordance with at least one embodiment, the pre-moderation feature may prohibit the user from submitting the content for publication or incorporation into a web site or web store until the user has provided new text or images or modified the text or images that correspond to the generated warnings and include non-compliant content. In accordance with at least one embodiment, the pre-moderation feature may attempt to correct some non-compliant content such as misspelled words and inform the user of actions taken to add another level of review prior to submission of the content to a moderation service. In embodiments, the service provider computers implementing the pre-moderation feature may maintain and update blacklists of text and images that correspond to non-compliant images. In embodiments, the blacklists may be dynamically updated based at least in part on supervised machine learning algorithms that utilize the maintained blacklist words and images submitted by an entity. The service provider computers may select appropriate blacklists to compare newly submitted text and images to as part of determining whether the content is non-compliant based on information associated with the web site or information submitted by a user associated with the web site. For example, a user who hosts a web site offering adult content may provide an indication of adult content such that appropriate blacklists are utilized in identifying non-compliant content. In embodiments, the pre-moderation feature may rank the non-compliant content based on data provided by an electronic marketplace where the rank that the non-compliant content warning is presented in denotes the importance to whether the content will be eventually incorporated into the web site or web store.

The processes and systems described herein may be an improvement on conventional content moderation systems. For example, conventional moderation services typically take days to weeks to utilize manual review (e.g., human oversight) when reviewing and identifying non-compliant content. Moreover, human review or moderation of submitted content is prone to human error that fails to utilize correct policies, misses small details in submitted content, or otherwise fails to compare submitted information to databases of information such as whether promotional messages can be supported by a given web store. The techniques described herein provide for more efficient and automatic identification of non-compliant content prior to the content being submitted for publication or incorporation into a web site or web store. The pre-moderation features described herein can extract text and images from submitted content to identify whether any submitted content is compliant or includes non-compliant content. The system can generate and communicate warnings or recommendations to users such that the users have an opportunity to correct the non-compliant content and thus reduce the overall moderation turnover for their web site or web store. Further, as the pre-moderation feature learns from submitted content, updated blacklist libraries, and user feedback, users can bypass review by a human operated moderation service such that compliant content can be incorporated into a web site or web store with in a manner of minutes as opposed to days or weeks.

FIG. 1 illustrates a workflow for a pre-moderation feature in accordance with at least one embodiment. The workflow 100 of FIG. 1 includes a user 102 utilizing a user device 104 to submit content 106 for incorporation into a web store 108. As illustrated in FIG. 1, the user web store 108 and content submission 106 are presented via a web browser 110. However, the pre-moderation features described herein are also applicable in native applications or user interfaces presented via a variety of user devices such as mobile phones, wearable devices, etc. The content submission 106 may include an image that also has text such as an image of t-shirts with corresponding text of "Buy 3 get 1 for free!" In workflow 100 the user 102 may utilize an input/output device of the user device 104, such as mouse pointer 112, to initiate the content submission 106 for publishing 114. In accordance with at least one embodiment, as the user 102 provides content (such as 106) to the web store 108 the content may be saved to a data store such as data store 116. The provision of content for incorporation into the web store 108 also initiates the transmittal of a message with an image key to the pre-moderation service at 118. The saving of the data (image data 116 for example) that corresponds to submitted content and the provision of the message with the image key 118 to the pre-moderation service occurs each time the user 102 modifies the web store 108 such that the data is dynamically updated as the user 102 provides more content or adjusts content of the web store 108.

In workflow 100 the initiation of the content for publishing 114 is transmitted to the pre-moderation service provider computers 120 (service provider computers 120) via available networks (not pictured) such as the Internet. Once the user 102 interacts with the submit for publishing element 114 of the web store 108 during a modification process for the web store 108, the web store 108 interface is locked and the user is prohibited from making any further changes until the service computers 120 have analyzed the submitted content 106. In embodiments, the service provider computers 120 may utilize a web page identifier (ID) 122 to request web page data 124 from a web page service 126. As described herein, the web page data 124 may include item stock information, promotional availability information, and/or shipping information that is associated with web store 108 and which can be retrieved using the unique web page identifier 122. The pre-moderation features described herein may identify whether text and images that correspond to promotional messages include non-compliant content based on the web page data 124.

The service provider computers 120 in workflow 100 may retrieve 128 the image data 116 using the image key 118 provided when the user 102 submitted the content 106. In accordance with at least one embodiment, an OCR engine 130 may execute optical character recognition 132 on the image data 116 retrieved at 128. In embodiments, the OCR engine 130 may be configured to identify text, text strings, text phrases, and images included in the image data 116 or submitted content 106 using recognition algorithms such as optical character recognition, image recognition, or object recognition. In workflow 100 the OCR engine 130 may store the text from the image 134 in the extracted data store 136. In accordance with at least one embodiment, the service provider computers 120 may pre-moderate the data at 138 by comparing the extracted data 136 to one or more blacklists of text and/or images according to compliance policies maintained by the service provider computers 120 as well as determine whether any promotional messages violate the compliance policies using the web page data 124. In use cases where the service provider computers 120 identify non-compliant content, the service provider computers 120 may generate one or more warnings 140 which are then transmitted to the user 102 via the web store 108. In embodiments, the service provider computers 120 may update the user interface or web browser 110 to inform the user 102 about the non-compliant content as illustrated in below in FIGS. 2 and 3. In embodiments, a user may take further action such as by using user device 104 to modify the submitted content 106 and attempt to fix any non-compliant content prior to the web store 108 and submitted content 106 being provided to a moderation service. In embodiments, the moderation service may be operated by a third party or by an electronic marketplace.

Figure 2:
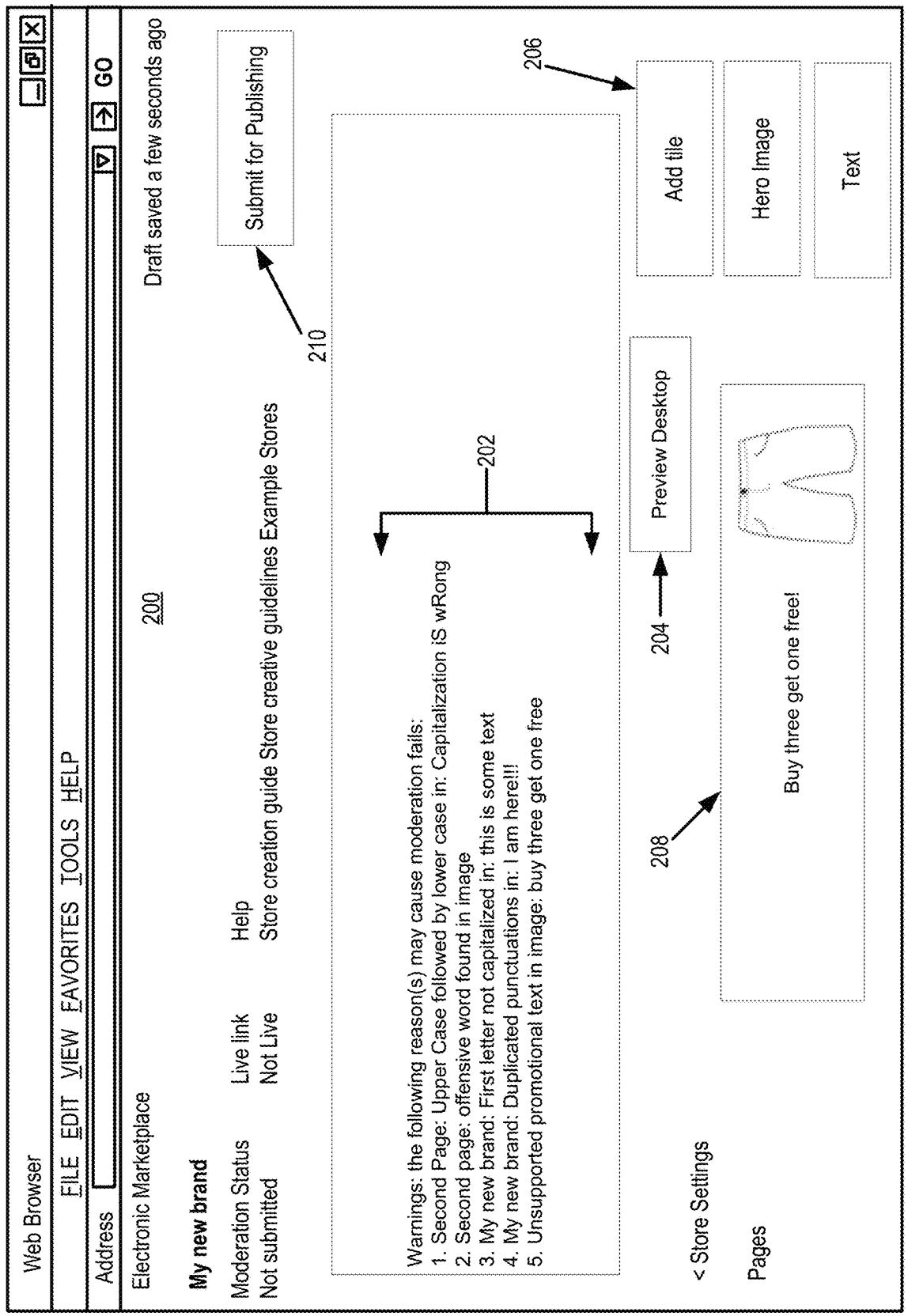
FIG. 2 illustrates an example user interface for presenting warnings that correspond to a pre-moderation feature in accordance with at least one embodiment.

FIG. 2 illustrates an example user interface for presenting warnings that correspond to a pre-moderation feature in accordance with at least one embodiment. The user interface 200 of FIG. 2 corresponds to an updated user interface that is presented to a user that includes warnings 202 generated in response to the pre-moderation feature identifying non-compliant content. The user interface 200 may include several features for exploring the non-compliant content including a preview 204 of how the content would look if it were incorporated as well as other options to add a tile or other text 206 to the interface 200. In user interface 200 the pre-moderation feature may present the images that include non-compliant text or are themselves non-compliant at 208. In accordance with at least one embodiment, the warnings 202 may be ranked according to their severity where the severity of the warnings are specified by an associated electronic marketplace. As described herein, a user may attempt to modify the text or images recently submitted in order to correct or comply with policies of an electronic marketplace and reduce the time required to incorporate the newly submitted content into their web site or web store by using the warnings 202 as a guide. If a user does not wish to make any changes or has made changes and wishes to submit the content for final approval by a moderation service, the user may interact with the submit for publishing element 210. In some embodiments, the service provider computers implementing the pre-moderation feature may prohibit the user from interacting with the submit for publishing element 210 until they have addressed some of the warnings or attempted to address some of the warnings such as by providing updated input.

Figure 3:
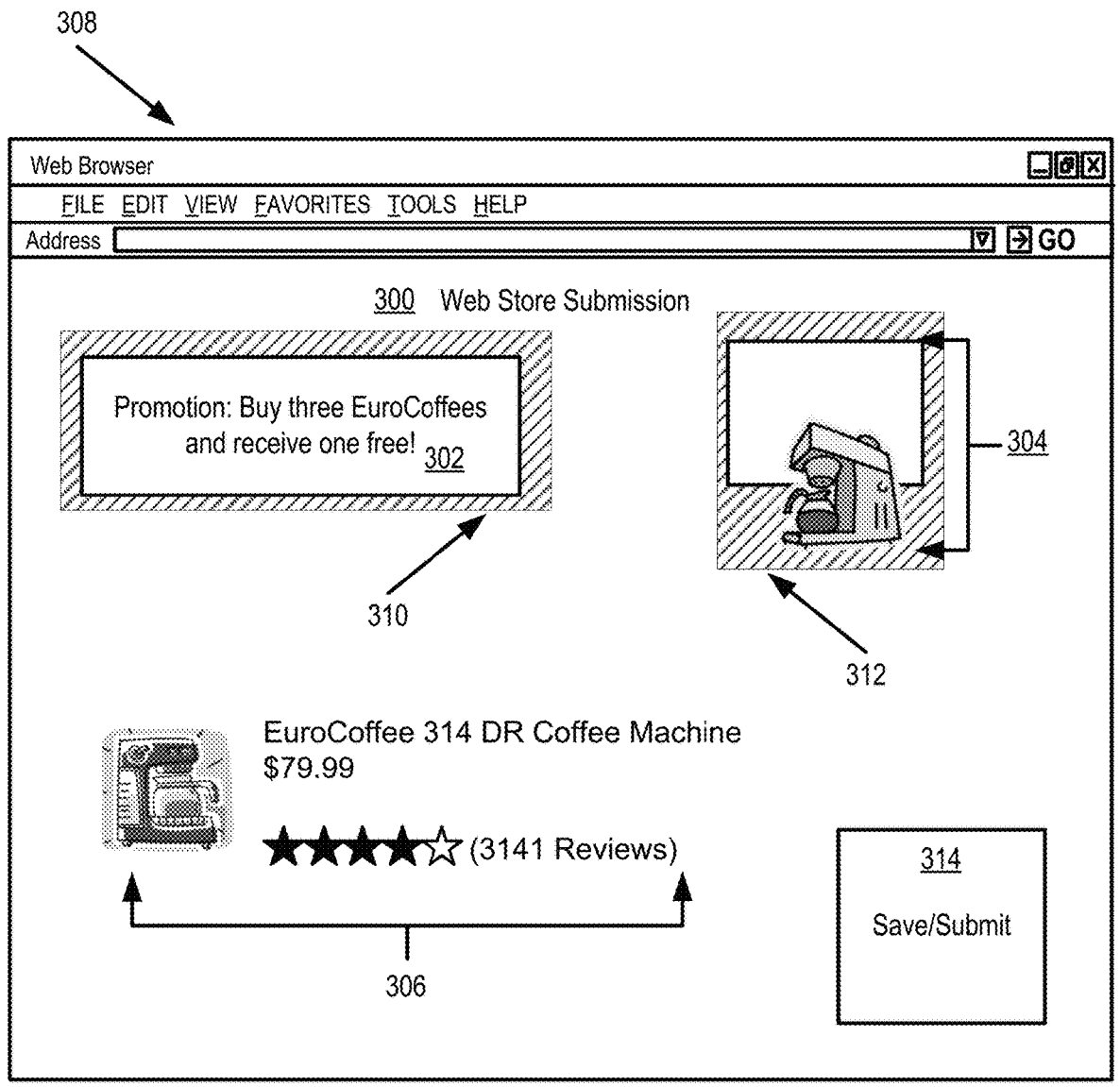
FIG. 3 illustrates an example user interface for presenting warnings that correspond to a pre-moderation feature in accordance with at least one embodiment.

FIG. 3 illustrates an example user interface for presenting warnings that correspond to a pre-moderation feature in accordance with at least one embodiment. The user interface 300 of FIG. 3 includes several recently submitted content pieces such as promotional message 302, image 304, and item image and text 306. In embodiments, the user interface 300 is presented via a web browser 308. The user interface 300 of FIG. 3 may correspond to a modified interface in response to a user attempting to modify the web store by adding the content 302-306 and the content being pre-moderated by service provider computers implementing the pre-moderation features described herein. In accordance with at least one embodiment, the pre-moderation features may visually indicate, such as by highlighting, portions of the web store, web site, or individual content pieces (submitted text or images) that correspond to generated warnings of non-compliant content. The service provider computers implementing the pre-moderation features may use different colors to indicate a severity of the warning or non-compliant content which corresponds to whether such an error in the submitted content would still pass a review by a moderation service when the user tries to publish such content.

For example, the user interface 300 includes several highlighted areas 310 and 312 which correspond to non-compliant promotional message 302 and non-compliant image 304. For example, the promotional message 302 may be non-compliant because the store data that corresponds to user interface 300 may not be able to support the buy three get one for free promotion. FIG. 3 also illustrates non-compliant image 304 because the image is not contained within a user interface element. The item image and text 306 of FIG. 3 do not have a highlighted area as they do not have any non-compliant content. In embodiments, a user may interact with user interface 300 to correct the non-compliant content prior to submitting 314 the web store and attempting to incorporate content items 302-306.

Figure 4:
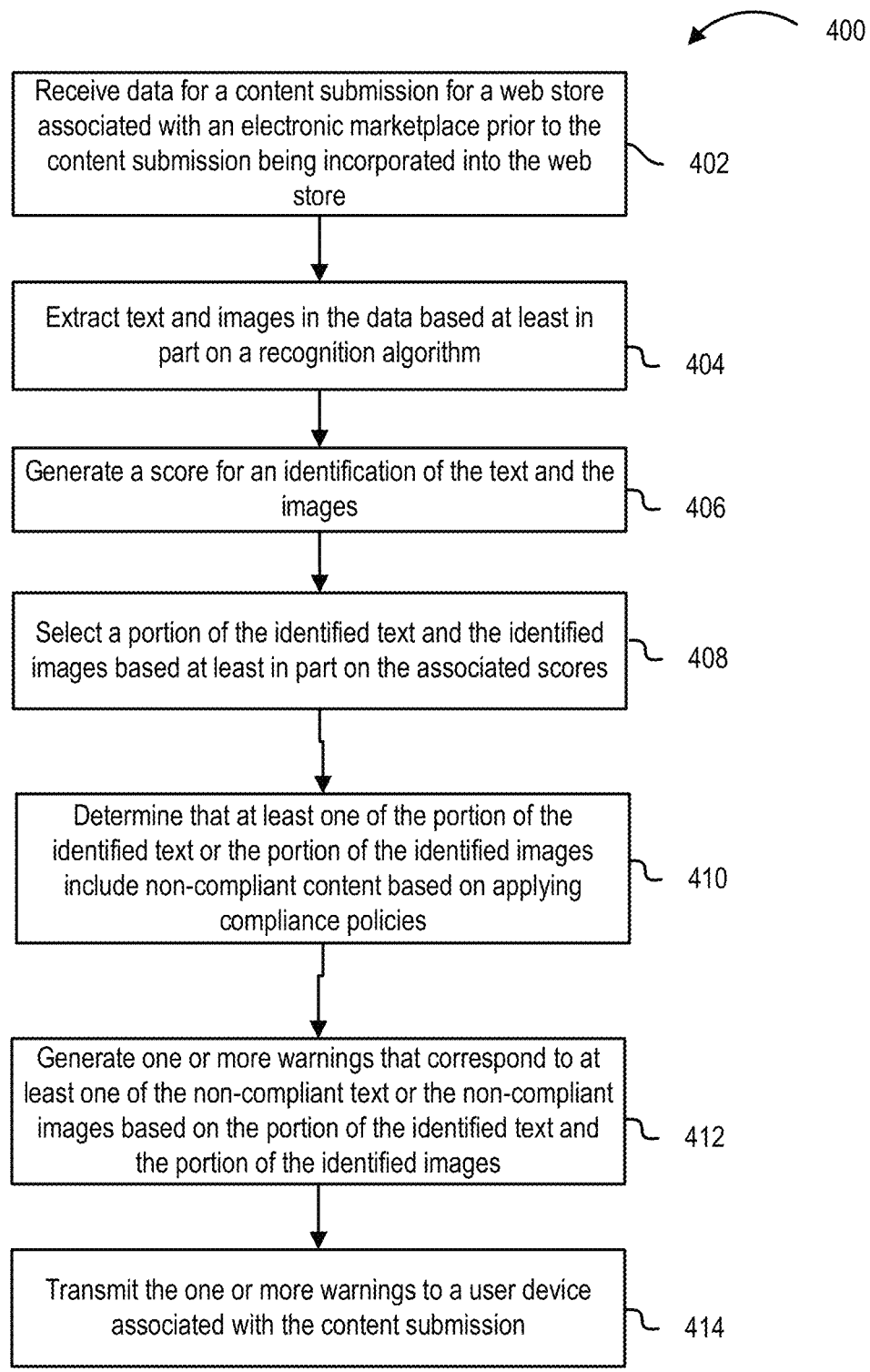
FIG. 4 illustrates a flow diagram of a process for a pre-moderation feature in accordance with at least one embodiment.
Figure 5:
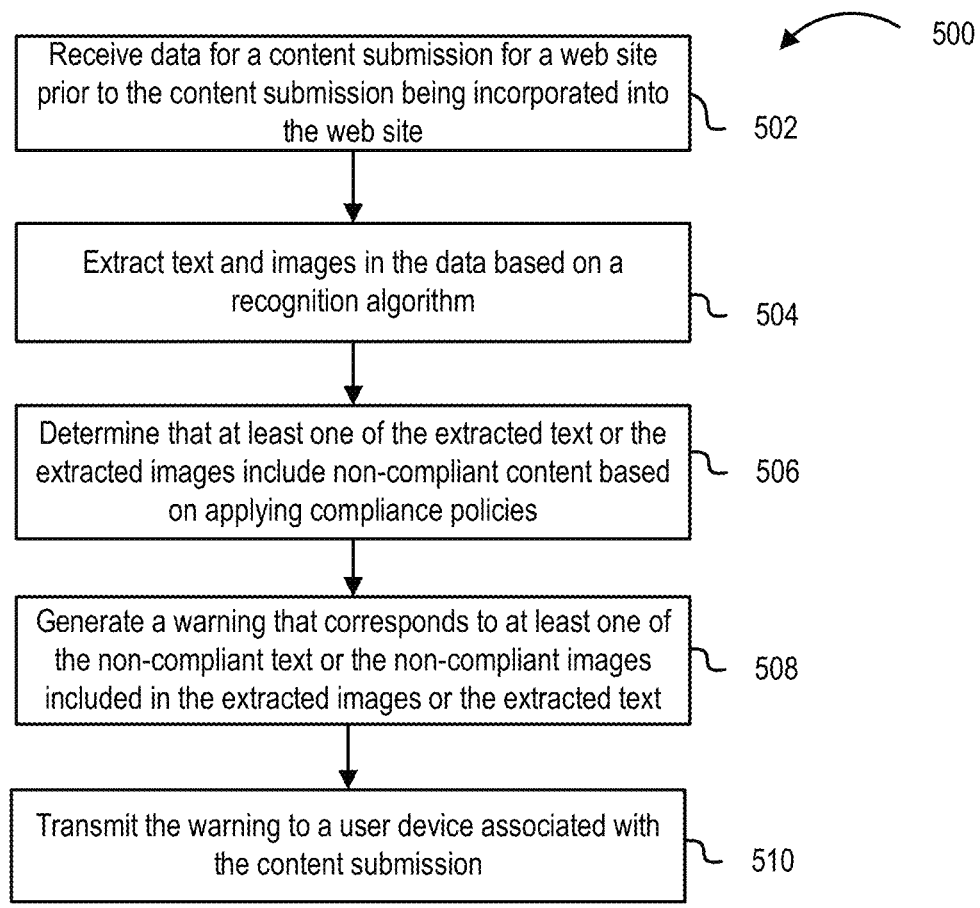
FIG. 5 illustrates a flow diagram of a process for a pre-moderation feature in accordance with at least one embodiment.

FIGS. 4 and 5 illustrate example flow charts for pre-moderation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 6:
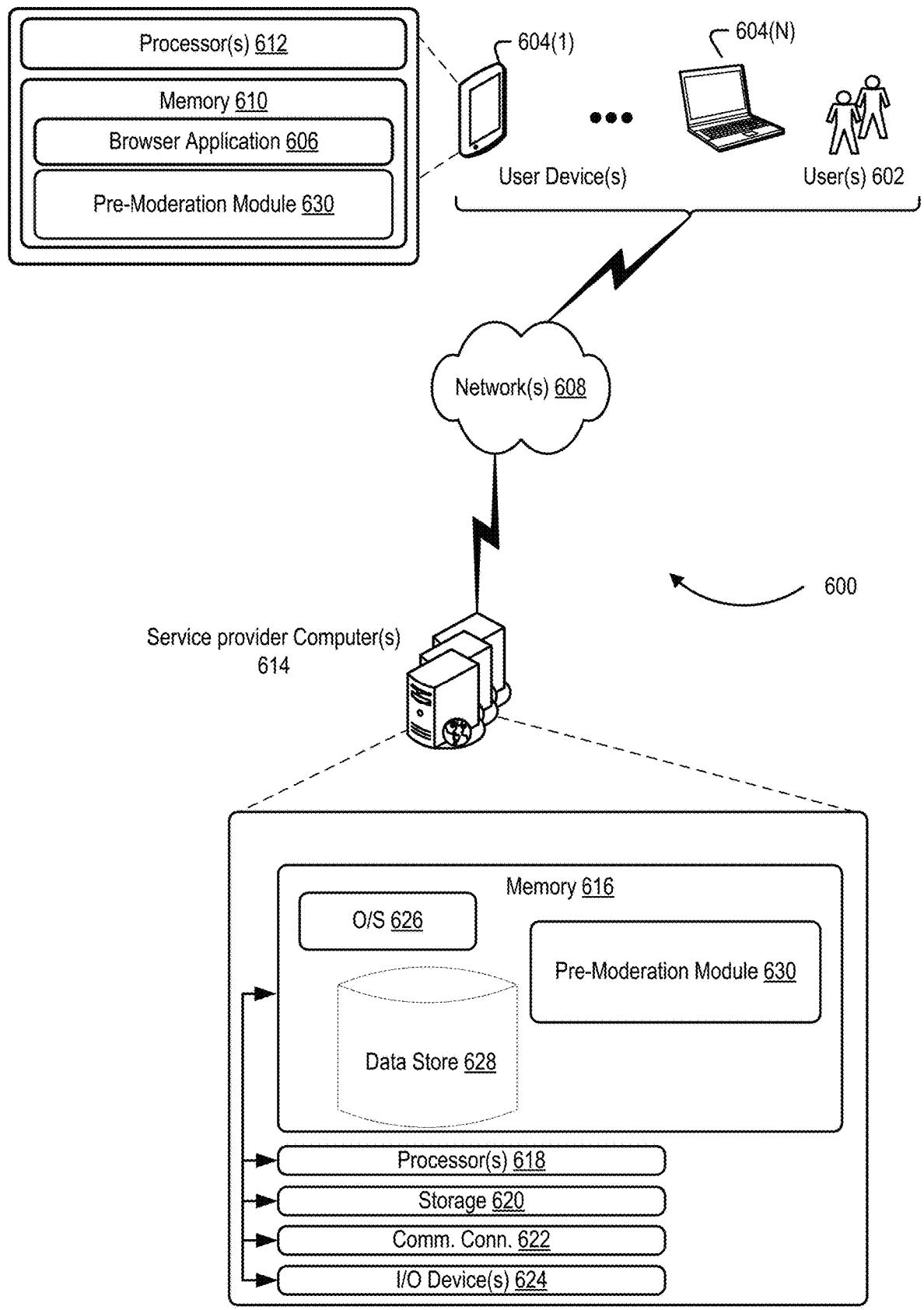
FIG. 6 illustrates an example architecture for implementing a pre-moderation feature as described herein that includes a user device and one or more service provider computers which may be connected via one or more networks in accordance with at least one embodiment.

In some examples, service provider computers (service provider computers 120 and 614) utilizing at least the pre-moderation module 630 depicted in FIGS. 1 and 6 may perform the processes 400 and 500 of FIGS. 4 and 5. In FIG. 4, the process 400 may include receiving data for a content submission for a web store associated with an electronic marketplace prior to the content submission being incorporated into the web store at 402. For example, a user that utilizes a web store associated with an electronic marketplace may wish to provide an update to their web store, perhaps to sell new products for example. The user may interact with a user interface and provide new content such as images or additional text that they wish to incorporate into their web store. Conventionally a user may interact with a submit content or submit for publishing button or element of the user interface to initiate a process where manual moderation may identify whether the newly submitted content (images or text) includes non-compliant content. The process 400 may include extracting text and images in the data based at least in part on a recognition algorithm at 404. In embodiments, the service provider computers implementing the pre-moderation feature may utilize optical character recognition algorithm, an image recognition algorithm or an object detection algorithm to identify the text and images included in the content.

The process 400 may include generating a score for an identification of the text and the images included in the content that have been extracted at 406. In embodiments, each score for a text object, text string, or image object represents a confidence of the identification of said text or image using the recognition algorithms. The process 400 may include selecting a portion of the identified text and the identified images based at least in part on the associated scores at 408. In accordance with at least one embodiment, the service provider computers may maintain one or more thresholds that are utilized to determine whether the recognition algorithms have accurately identified a text or image object. For example, identified text and images may be selected for the pre-moderation feature when their corresponding scores exceed a given threshold specified by the electronic marketplace or each user. Text or images included in the submitted content or data that have scores that do not exceed the threshold may be marked or otherwise indicated as further investigation or identification by the manual moderation service of the electronic marketplace.

The process 400 may include determining that at least one of the portion of the identified text or the portion of the identified images include non-compliant content based at least in part on applying compliance policies at 410. In embodiments, the identified text or images may be compared to a blacklist of words, phrased, or strings, as well as images which are indicated to be non-compliant according to the compliance policies of the electronic marketplace. In accordance with at least one embodiment, compliance policies may include identifying whether proper grammar is being utilized, whether images are properly cropped or fit to their user interface element, as well as whether promotional content is supported by the store as described herein. The process 400 may include generating one or more warnings that correspond to at least one of the non-compliant text or the non-compliant images based at least in part on the portion of the identified text and the portion of identified images at 412. In accordance with at least one embodiment, the warnings may include information about which text object or images object is non-compliant and why it is non-compliant. In embodiments, a user interface may be updated or otherwise modified to visually indicate which portions of the web site or web store include non-compliant content. The process 400 may include transmitting the one or more warnings to a user device associated with the content submission at 414. In embodiments, the user interface that the user interacts with to submit the content may be updated to include information about the warnings. In accordance with at least one embodiment, a user may be unable to submit the content for publication or incorporation until they have provided further input that corresponds to the warnings. For example, if a warning indicates that a certain text string includes improper grammar, misspellings, or incorrect capitalization, the system may prohibit the user from submitting the content for moderation until the corresponding text or image element is updated with new data (e.g., the user provides a different text item or image or modifies the current text item or image).

The process 500 may include receiving data for a content submission for a web site prior to the content submission being incorporated into the web site at 502. The process 500 may include extracting text and images in the data based at least in part on a recognition algorithm at 504. The process 500 may include determining that at least one of the extracted text or the extracted images include non-compliant content based on applying compliance policies at 506.

In accordance with at least one embodiment, the service provider computers implementing the pre-moderation feature may maintain one or more compliance polices where some of the non-compliance policies are utilized for different item categories of an electronic marketplace. In embodiments, compliance policies to apply to the extracted text and images may be selected based at least in part on information associated with a web site or web store. For example, a web store may offer adult content such that compliance policies for children's toys would be inappropriate and likely indicate a large amount of non-compliant content included in submitted content for such a web store.

The pre-moderation feature implemented by the service provider computers can select the appropriate compliance policies to apply based on information provided by a user associated with a web store or web site or it can be selected based on information obtained by the service provider computer such as item categories, geographic location, purchase history, or contextual information. The process 500 may include generating a warning that corresponds to at least one of the non-compliant text or the non-compliant images included in the extracted images or the extracted text at 508. The process 500 may include transmitting the warning to a user device associated with the content submission at 510. In accordance with at least one embodiment, the service provider computers implementing the pre-moderation feature may attempt to correct some of the non-compliant text or images such as by correcting misspellings, attempting to properly capitalize words, provide punctuation, or move image objects within a boundary of a user interface element. In use cases where the service provider computers automatically correct non-compliant text or images the warning may still indicate the non-compliant content and further indicate that steps have been taken to correct but may need further review for example by the user.

FIG. 6 illustrates an example architecture for implementing a pre-moderation feature as described herein that includes a user device and one or more service provider computers which may be connected via one or more networks in accordance with at least one embodiment. In architecture 600, one or more users 602 (e.g., customers, users, consumers, etc.,) may utilize user computing devices 604(1)-(N) (collectively, user devices 604) to access a browser application 606 or a user interface (UI) accessible through the browser application 606, via one or more networks 608 to request content including media content or online marketplaces and electronic marketplaces or submit content for including and/or adjusting content for a web site or web store. In embodiments, the one or more users 602 may utilize user computing devices 604(1)-(N) to access the browser application 606 or a UI accessible through the browser application 606, via one or more networks 608, to request content including media content, electronic catalogs, online marketplaces, or electronic marketplaces from a third party computer (not pictured) or from service provider computers 614. In embodiments, the one or more users 602 may utilize user computing devices 604(1)-(N) to access the browser application 606 or a UI accessible through the browser application 606, via one or more networks 608, to submit content such as new content or adjust content already present for a website or web store hosted by a third party computer or service provider computers 614. The "browser application" 606 can be any browser control or native application that can access and display a network page or other information such as a user interface of a native software application for submitting content or adjusting content already present in a web site or web store according to the pre-moderation feature described herein. A native software application may include an application or program that has been developed for use on a particular platform (such as an operating system) or a particular device (such as a particular type of mobile device or user device 604). In embodiments, the user device 604 may include one or more components for enabling the user 602 to interact with the browser application 606.

The user devices 604 may include at least one memory 610 and one or more processing units or processor(s) 612. The memory 610 may store program instructions that are loadable and executable on the processor(s) 612, as well as data generated during the execution of these programs. Depending on the configuration and type of the user devices 604, the memory 610 may be volatile (such as random access memory (RAM)) and/or non-volatile (such as read-only memory (ROM), flash memory, etc.). The user devices 604 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 604. In some implementations, the memory 610 may include multiple different types of memory, such as static random access memory (SRAM), dynamic random access memory (DRAM), or ROM.

Turning to the contents of the memory 610 in more detail, the memory 610 may include an operating system and one or more application programs or services for implementing the features disclosed herein. Additionally, the memory 610 may include one or more modules for implementing the features described herein including the pre-moderation module 630.

The architecture 600 may also include one or more service provider computers 614 that may, in some examples, provide computing resources such as, but not limited to, client entities, low latency data storage, durable data store, data access, management, virtualization, hosted computing environment or "cloud-based" solutions, electronic content performance management, electronic marketplace management, media streaming services, content generation, web store management, etc. The service provider computers 614 may implement or be an example of the service provider computer(s) described throughout the disclosure. The one or more service provider computers 614 may also be operable to provide site hosting, electronic marketplaces, media streaming services, computer application development, and/or implementation platforms, combinations of the foregoing, or the like to the one or more users 602 via user devices 604.

In some examples, the networks 608 may include any one or a combination of many different types of networks, such as cable networks, the Internet, wireless networks, cellular networks, and other private and/or public networks. While the illustrated examples represents the users 602 communicating with the service provider computers 614 over the networks 608, the described techniques may equally apply in instances where the users 602 interact with the one or more service provider computers 614 via the one or more user devices 604 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 614 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 614 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 614 may be in communication with the user device 604 via the networks 608, or via other network connections. The one or more service provider computers 614 may include one or more servers, perhaps arranged in a cluster or as individual servers not associated with one another.

In one illustrative configuration, the one or more service provider computers 614 may include at least one memory 616 and one or more processing units or processor(s) 618. The processor(s) 618 may be implemented as appropriate in hardware, computer-executable instructions, firmware, or combination thereof. Computer-executable instruction or firmware implementations of the processor(s) 618 may include computer-executable or machine-executable instructions written in any suitable programming language to perform the various functions described when executed by a hardware computing device, such as a processor. The memory 616 may store program instructions that are loadable and executable on the processor(s) 618, as well as data generated during the execution of these programs. Depending on the configuration and type of the one or more service provider computers 614, the memory 616 may be volatile (such as RAM) and/or non-volatile (such as ROM, flash memory, etc.). The one or more service provider computers 614 or servers may also include additional storage 620, which may include removable storage and/or non-removable storage. The additional storage 620 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 616 may include multiple different types of memory, such as SRAM, DRAM, or ROM.

The memory 616, the additional storage 620, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 616 and the additional storage 620 are all examples of non-transitory computer storage media. Additional types of non-transitory computer storage media that may be present in the one or more service provider computers 614 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 614. Combinations of any of the above should also be included within the scope of non-transitory computer-readable media.

The one or more service provider computers 614 may also contain communication connection interface(s) 622 that allow the one or more service provider computers 614 to communicate with a data store, another computing device or server, user terminals, and/or other devices on the networks 608. The one or more service provider computers 614 may also include I/O device(s) 624, such as a keyboard, a mouse, a pen, a voice input device, a touch input device, a display, speakers, a printer, etc.

Turning to the contents of the memory 616 in more detail, the memory 616 may include an operating system 626, one or more data stores 628, and/or one or more application programs or services for implementing the features disclosed herein including the pre-moderation module 630. In accordance with at least one embodiment, the pre-moderation module 630 may be configured to at least extract text and/or images from a content submission or from data provided by a user that is to be incorporated into a web store or web site, generate scores that represent an identification of the text and images using recognition techniques such as OCR, determine whether the identified text or images include non-compliant content by utilizing compliance policies that include at least blacklisted words, images, or promotional policies, generate warnings or recommendations that include information about the non-compliant images or non-compliant text, and transmit the warnings or recommendations to a user device such as by updating a user interface to include information about the warnings or recommendations as well as highlight or otherwise indicate the portions of the web site or web store that correspond to the non-compliant text or non-compliant images.

Figure 7:
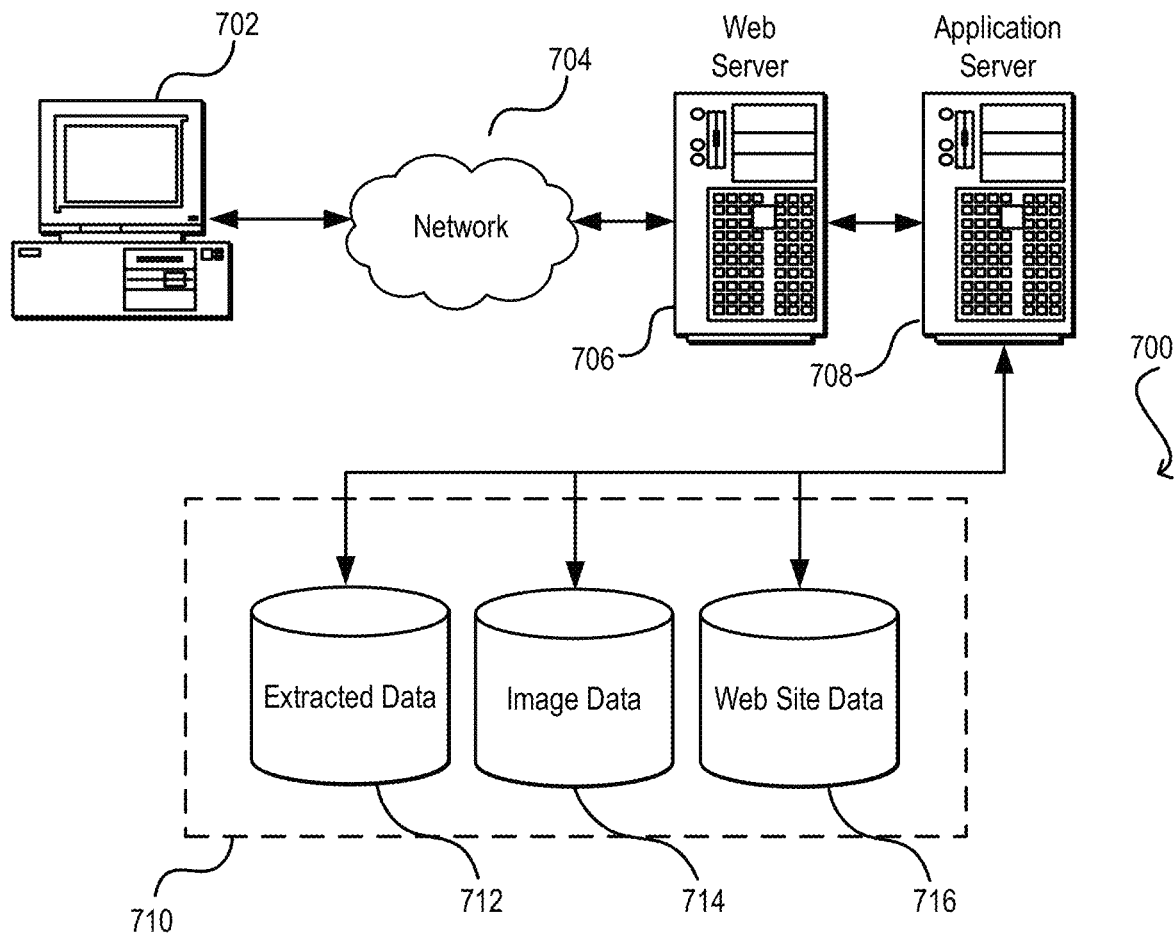
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server 706. It should be understood that the Web server 706 and application server 708 are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing extracted data 712 and web site data 716, which can be used to serve content for the production side, identify non-compliant text or images included in submitted content, and generate warnings or recommendations which can be transmitted to a user device to enable a user to fix non-compliant content prior to the content being submitted to a moderation service. The data store also is shown to include a mechanism for storing image data 714, which can be used for reporting, analysis, or other such purposes including at least identifying non-compliant text or images include in image content or video content as described herein using at least one or more recognition algorithms. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed.

No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computer system, data for a content submission for a web store associated with an electronic marketplace prior to the content submission being incorporated into the web store;
    extracting, by the computer system, text and images in the data based at least in part on a recognition algorithm;
    generating, by the computer system, a score for an identification of the text and the images, the score representing a confidence in the identification of the text and the images;
    selecting, by the computer system, a portion of the identified text and the identified images based at least in part on associated scores;
    determining, by the computer system, that at least one of the portion of the identified text or the portion of the identified images include non-compliant text or non-compliant images based at least in part on applying compliance policies maintained by the electronic marketplace, the compliance policies selected based at least in part on an item category associated with the content submission and a type of the web store;
    generating, by the computer system, one or more warnings that correspond to at least one of the non-compliant text or the non-compliant images based at least in part on the portion of the identified text and the portion of the identified images; and
    transmitting, by the computer system, the one or more warnings to a user device associated with the content submission.

2. The computer-implemented method of claim 1, further comprising modifying, by the computer system, a subset of the data in response to determining that at least one of the portion of the identified text or the portion of the identified images include non-compliant text or non-compliant images.

3. The computer-implemented method of claim 1, wherein each compliance policy of the compliance policies corresponds to a different item category of the electronic marketplace.

4. The computer-implemented method of claim 3, further comprising selecting a compliance policy of the compliance policies based at least in part on information associated with the web store.

5. The computer-implemented method of claim 1, further comprising maintaining a threshold, wherein selecting the portion of the identified text and the identified images is further based at least in part on the corresponding scores exceeding the threshold.

6. The computer-implemented method of claim 5, further comprising transmitting the extracted text and the extracted images to a moderation service in response to the score for the identification being below the threshold.

7. A computer-readable storage medium storing computer-executable instructions that, when executed by a computer system, configure the computer system to perform operations comprising:
    receiving data for a content submission for a web site prior to the content submission being incorporated into the web site;
    extracting text and images in the data based at least in part on a recognition algorithm;
    in response to determining that at least one of the extracted text or the extracted images include non-compliant text or non-compliant images based at least in part on applying compliance policies, the compliance policies selected based at least in part on an item category associated with the content submission and a type of the web site:
        generating a warning that corresponds to at least one of the non-compliant text or the non-compliant images included in the extracted images or the extracted text; and
        transmitting the warning to a user device associated with the content submission.

8. The computer-readable storage medium of claim 7, wherein the operations further comprise prohibiting the content submission from being incorporated into the website until new data is received from the user device that corresponds to the warning.

9. The computer-readable storage medium of claim 7, wherein the operations further comprise, in response to receiving new data from the user device that corresponds to the warning, transmitting the data, the new data, and the web site to a moderation service.

10. The computer-readable storage medium of claim 7, wherein the operations further comprise maintaining web store information for the web site that includes at least item stock information, shipping option information, and membership information.

11. The computer-readable storage medium of claim 10, wherein a policy of the compliance policies identifies whether at least one of the text or the images violate the web store information.

12. The computer-readable storage medium of claim 7, wherein the operations further comprise maintaining a library of blacklisted words and blacklisted images, wherein applying the compliance policies includes utilizing the library of blacklisted words and blacklisted images.

13. The computer-readable storage medium of claim 7, wherein the data includes video content, and wherein extracting the text and the images is further based at least in part on analyzing each frame of the video content and using the recognition algorithm.

14. A computer system comprising:
a memory configured to store computer-executable instructions; and
a processor in communication with the memory configured to execute the computer-executable instructions to at least:
receive data for a content submission for a web site prior to the content submission being incorporated into the web site;
extract text and images in the data based at least in part on a recognition algorithm;
determine that at least one of the extracted text or the extracted images include non-compliant text or non-compliant images based at least in part on applying compliance policies, the compliance policies selected based at least in part on an item category associated with the content submission and a type of the web site;
generate a warning that corresponds to at least one of the non-compliant text or the non-compliant images included in the extracted images and the extracted text; and
transmit the warning to a user device associated with the content submission.

15. The computer system of claim 14, wherein the processor is further configured to update a user interface of the user device to indicate portions of the web site that correspond to the warning.

16. The computer system of claim 14, wherein the processor is further configured to assign the text and the images with a corresponding unique identifier.

17. The computer system of claim 14, wherein the processor is further configured to associate the extracted text and the images to the web site via the corresponding unique identifiers.

18. The computer system of claim 14, wherein the processor is further configured to update the compliance policies based on user feedback in response to receiving the warning.

19. The computer system of claim 14, wherein the warning is associated with at least one of merchandising messages, image cropping, promotional messages, out of stock messages, low-resolution images, image obscuration, broken hyperlinks, or grammar issues in the text.

20. The computer system of claim 14, wherein the processor is further configured to generate a plurality of warnings that correspond to at least one of the non-compliant text or the non-compliant images included in the extracted images and the extracted text; and
rank the plurality of warnings prior to transmitting the plurality of warnings based at least in part on input from an entity associated with the compliance policies.

* * * * *